United States Patent
Nekhamkin et al.

(10) Patent No.: US 8,019,311 B2
(45) Date of Patent: Sep. 13, 2011

(54) SYSTEMS AND METHODS FOR DC COMPONENT RECOVERY IN A ZERO-IF RADIO RECEIVER

(75) Inventors: Michael Nekhamkin, Bridgewater, NJ (US); Liangkai Yu, New Providence, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 684 days.

(21) Appl. No.: 12/213,997

(22) Filed: Jun. 27, 2008

(65) Prior Publication Data
US 2009/0325532 A1    Dec. 31, 2009

(51) Int. Cl.
H04B 1/26 (2006.01)
H04B 1/18 (2006.01)
(52) U.S. Cl. .............. 455/313; 455/165.1; 455/190.1; 455/192.1
(58) Field of Classification Search ........... 455/313, 455/323, 205, 216, 182.1, 183.1, 190.1, 192.1, 455/165.1
See application file for complete search history.

(56) References Cited

U.S. PATENT DOCUMENTS

| | | | |
|---|---|---|---|
| 5,052,050 A | 9/1991 | Collier et al. | |
| 6,029,058 A * | 2/2000 | Namgoong et al. | 455/324 |
| 6,335,656 B1 * | 1/2002 | Goldfarb et al. | 327/559 |
| 6,445,726 B1 * | 9/2002 | Gharpurey | 375/136 |
| 6,882,834 B1 * | 4/2005 | Balboni | 455/255 |
| 6,985,711 B2 * | 1/2006 | Holenstein et al. | 455/312 |
| 7,224,722 B2 * | 5/2007 | Shi et al. | 375/219 |
| 7,308,242 B2 | 12/2007 | Sorrells et al. | |
| 7,415,260 B2 * | 8/2008 | Stockstad et al. | 455/312 |
| 2004/0240588 A1 | 12/2004 | Miller | |
| 2007/0211786 A1 | 9/2007 | Shattil | |
| 2008/0088507 A1 | 4/2008 | Smith et al. | |

OTHER PUBLICATIONS

National Association of Broadcasters—National Radio Systems Committee, "NRSC-5-A In band/on-channel Digital Radio Broadcasting Standard", Sep. 2005, pp. 1-36, "http://www.nrscstandards.org."
International Search Authority/U.S., International Search Report and Written Opinion for PCT App. No. PCT/US09/03821, Aug. 6, 2009, pp. 1-10.

* cited by examiner

Primary Examiner — Sonny Trinh
(74) Attorney, Agent, or Firm — Jones Day

(57) ABSTRACT

Methods and systems for recovering a DC component in a zero-IF radio receiver are disclosed that involve receiving a frequency modulated radio frequency broadcast signal, down-converting the frequency modulated radio frequency broadcast signal directly to an original baseband frequency signal, wherein the original baseband frequency signal includes an original DC component, filtering the original baseband signal to obtain a filtered baseband signal, wherein the original DC component is removed, analyzing modulus values of the filtered baseband signal to determine an estimated quantity for the original DC component, and adding the estimated quantity for the original DC component to the filtered baseband signal to compensate for removal of the original DC component such that a reconstructed baseband signal is obtained.

34 Claims, 7 Drawing Sheets

SYSTEMS AND METHODS FOR DC COMPONENT RECOVERY IN A ZERO-IF RADIO RECEIVER

BACKGROUND

1. Field of the Disclosure

The present disclosure relates to radio broadcast receivers and, in particular, to methods and systems for recovering a DC component in a zero intermediate frequency (referred to herein as zero-IF) radio receiver.

2. Background Information

Digital radio broadcasting technology delivers digital audio and data services to mobile, portable, and fixed receivers. One type of digital radio broadcasting, referred to as in-band on-channel (IBOC) digital radio broadcasting, uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC digital radio broadcasting signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC digital radio broadcasting promotes economy of spectrum while enabling broadcasters to supply digital quality audio to the present base of listeners.

Multicasting, the ability to deliver several audio programs or streams over one channel in the AM or FM spectrum, enables stations to broadcast multiple streams on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC digital radio broadcasting can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content over IBOC digital radio broadcasting transmissions can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5A IBOC standard. Further information regarding HD Radio technology can be found at www.hdradio.com and www.ibiquity.com.

Other types of digital radio broadcasting systems include satellite systems such as Satellite Digital Audio Radio Service (SDARS, e.g., XM Radio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

Some modern radio receivers use a zero-IF architecture (sometimes referred to as direct conversion) in which a signal is frequency down-converted in mixers directly to quadrature related in-phase (I) and quadrature (Q) signals at baseband frequencies. These I and Q signals are then applied to a demodulator in which the modulation in the signal is recovered. Zero-IF receivers can provide a number of advantages. For example, converting the incoming radio frequency (RF) signal directly to baseband allows channel amplification and filtering to be performed at baseband frequency, which facilitates integration of the receiver with other components. Additionally, zero-IF receivers may have lower gate counts, thereby resulting in lower power consumption and lower cost. The present inventors have observed that it would be desirable to utilize a zero-IF architecture in, for example, digital radio broadcast receivers that include analog FM receiver sections. It can also be used in analog FM-only receivers that use digital techniques for demodulation.

However, a problem with zero-IF receivers is that an unwanted DC voltage can be created at the mixer output in addition to the desired baseband signal. This unwanted DC voltage results from reverse-transmission paths in the tuner circuitry that occur when local oscillator (LO) energy leaks through the mixer, thereby causing the LO energy to self-mix, and also from the $2^{nd}$ order nonlinearity of the mixer and baseband amplifiers when the signal level is high. This unwanted DC voltage can create distortions in the baseband signal and so typically must be removed by placing a DC blocking filter in the tuner circuitry after the mixer. However, this approach typically removes not only the unwanted DC voltage, but also any legitimate DC component of the baseband signal. This removal of the DC component from the baseband signal can result in unacceptable distortions in the demodulated signal. As a result, the use of a zero-IF architecture has typically been restricted to applications that do not involve reception of signals having a significant DC component. This means that a zero-IF architecture typically has not been used in, for example, analog FM broadcast receivers or in the analog FM portion of digital FM radio broadcast receivers. Rather, such digital radio broadcast receivers have included a low-IF receiver section for receiving both digital FM and analog FM signals, or a zero-IF receiver section for receiving the digital FM signals and a low-IF receiver section for receiving the FM analog signals, wherein the receiver bifurcates the incoming signal to these two sections for demodulation. The present inventors have observed a need for methods and systems that permit receiving an analog FM signal using a zero-IF architecture, preferably the same zero-IF architecture used for receiving digital radio broadcast signals.

SUMMARY

Embodiments of the present disclosure are directed to systems and methods that may satisfy this need. According to exemplary embodiments, a method of DC recovery in a zero-IF radio receiver is disclosed. The method comprises the steps of receiving a frequency modulated radio frequency broadcast signal; down-converting the frequency modulated radio frequency broadcast signal directly to an original baseband frequency signal, wherein the original baseband frequency signal includes an original DC component; filtering the original baseband signal to obtain a filtered baseband signal, wherein the original DC component is removed; analyzing modulus values of the filtered baseband signal to determine an estimated quantity for the original DC component; and adding the estimated quantity for the original DC component to the filtered baseband signal to compensate for removal of the original DC component such that a reconstructed baseband signal is obtained.

A system comprising a processing system and a memory coupled to the processing system are described wherein the processing system is configured to carry out the above-described method. Computer programming instructions adapted to cause a processing system to carry out the above-described method may be embodied within any suitable computer readable medium.

BRIEF DESCRIPTION OF THE DRAWINGS

These and other features, aspects, and advantages of the present disclosure will become better understood with regard to the following description, appended claims, and accompanying drawings wherein:

DETAILED DESCRIPTION OF EXEMPLARY EMBODIMENTS

Embodiments described herein permit recovering the DC component of signals in a zero-IF radio receiver. Whereas aspects of the disclosure are presented in the context of an exemplary IBOC system, it should be understood that the present disclosure is not limited to IBOC systems and that the teachings herein are applicable to other forms of digital and analog radio broadcasting as well. Furthermore, while aspects of the disclosure are presented in the context of FM signals, the teachings herein may be applicable to other forms of modulated signals as well such as, for example, quadrature phase shift keying modulated signals or binary phase shift keying modulated signals.

Figure 1:
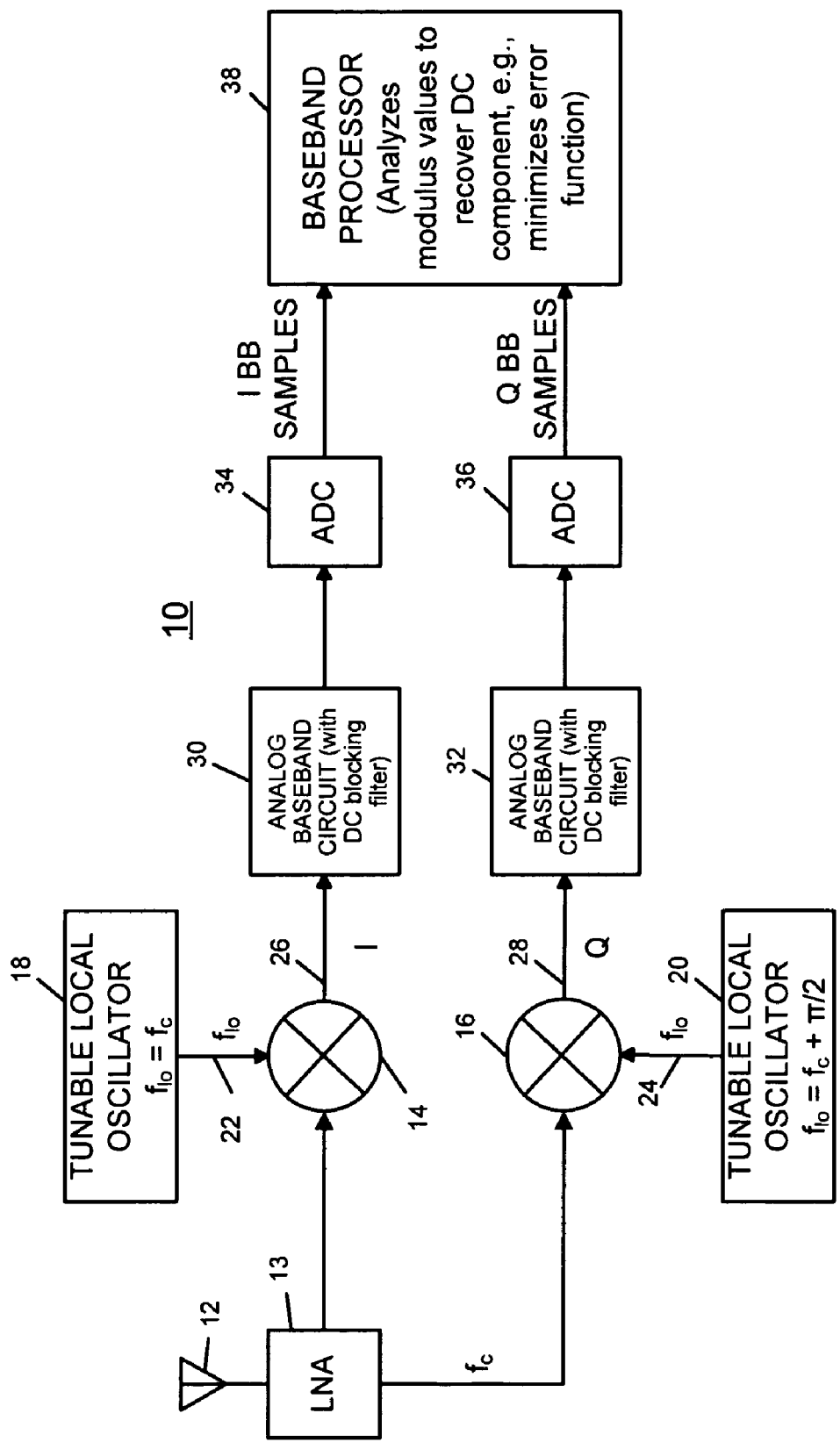
FIG. 1 illustrates a block diagram of an exemplary digital radio broadcast FM receiver in accordance with certain embodiments.

Referring to the drawings, FIG. 1, is a block diagram of an exemplary zero-IF digital radio broadcast receiver 10 that receives digital radio broadcasting signals. The exemplary digital radio broadcast receiver 10 may be a digital radio broadcast receiver such as an FM IBOC receiver, for example, configured to process an analog FM signal using a zero-IF architecture as described herein. The digital radio broadcast signal modulated at the carrier frequency $f_c$ is received on antenna 12 and a low-noise amplifier (LNA) 13 amplifies the signal. The received signal is input into first and second mixers 14. In the first mixer 14 the received signal is mixed with a local oscillator signal $f_{lo}$ supplied by a tunable local oscillator 18 on line 22 to generate an in-phase signal (I) at the baseband frequency. In a zero-IF architecture as described herein, the frequency of the tunable local oscillator $f_{lo}$ is typically substantially the same as the carrier frequency $f_c$. In the second mixer 16 the received signal is mixed with a local oscillator signal $f_{lo}$, which has been phase shifted by $\pi/2$ (90 degrees), produced by a tunable local oscillator 20 and supplied on line 24 to generate a quadrature signal (Q) at the baseband frequency.

An unwanted DC voltage typically results from, for example, reverse-transmission paths in the tuner circuitry that occur when the local oscillator energy leaks through the mixers, thereby causing the local oscillator energy to self-mix. Accordingly, the baseband I and Q signals 26, 28 are input into analog baseband circuits 30, 32, which include DC blocking filters to remove the unwanted DC voltage. The analog baseband circuits 30, 32 typically also include amplifiers and filters. However, typical FM signals also include a legitimate DC component, which is also removed by the DC blocking filters in the analog baseband circuits 30, 32. Thus a DC offset is created in the signal as a result of the removal of this legitimate DC component. Approaches are described herein for recovering this legitimate DC component.

The DC blocking filters may be, for example, any suitable high-pass or DC notch filters (e.g., composed of resistors and capacitors), which may include, for example, passive, active, and/or DC feedback implemented in DC amplifiers. In certain embodiments, filters with narrower stop-bands may be desirable to minimize the removal of low-frequency (i.e., non-DC) energy from the baseband signal and thereby minimize any potential distortions in the output signal. For example, a suitable filter may have a 60 Hz stop-band, although the range of suitable stop-bands may be, for example, from 60 Hz to 200 Hz. However, this will typically be implementation specific, and the selection of appropriate DC blocking filters is within the purview of one of ordinary skill in the art.

After processing in the analog baseband circuits 30, 32, the I and Q baseband signals enter analog-to-digital converters (ADCs) 34, 36. The ADCs 34, 36 produce complex digital baseband I and Q samples that are then sent to the baseband processor 38. The baseband processor 38 then provides additional signal processing and produces, among other things, output audio samples. The baseband processor 38 comprises a processing system that may include one or more processing units configured (e.g., programmed with software and/or firmware) to perform the functionality described herein, wherein the processing system of the baseband processor can be suitably coupled to any suitable memory (e.g., RAM, Flash ROM, ROM, etc.).

For example, a semiconductor chip may be fabricated by known methods in the art to include a processing system that comprises one or more processors as well as a memory, e.g., the processing system and the memory may be arranged in a single semiconductor chip, if desired, according to known methods.

Figure 2A:
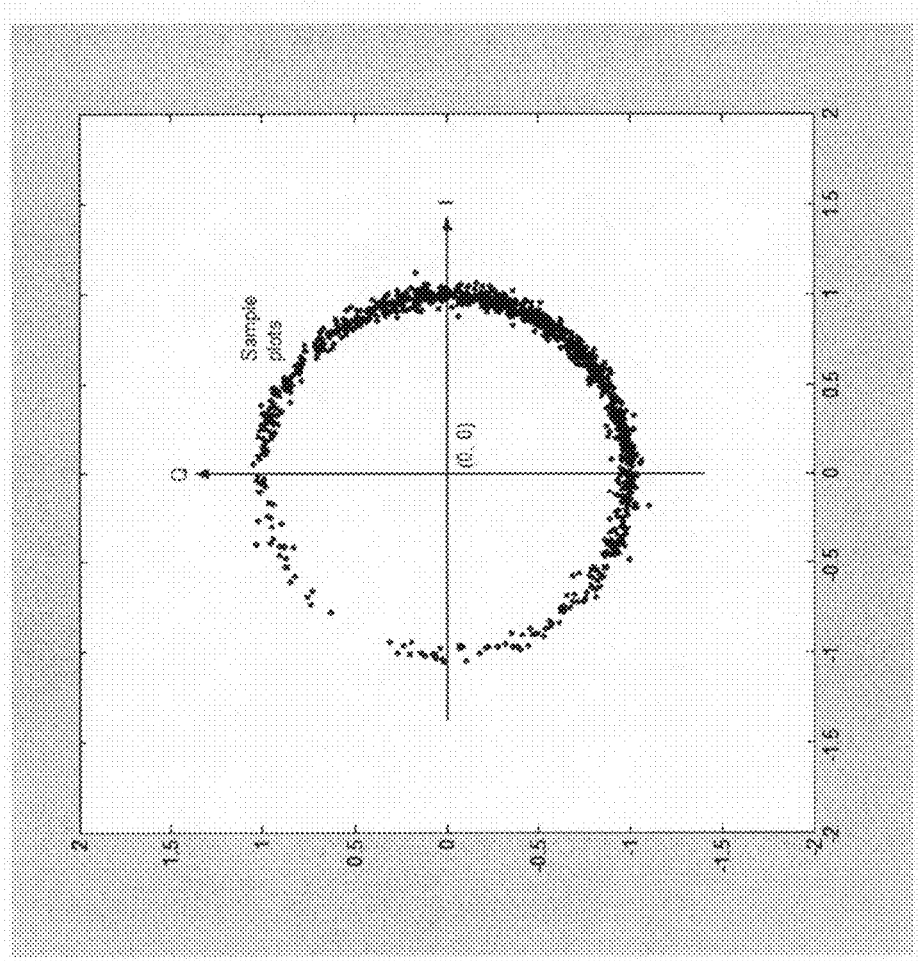
FIGS. 2a and 2b illustrate exemplary signal sample plots in accordance with certain embodiments.
Figure 2B:
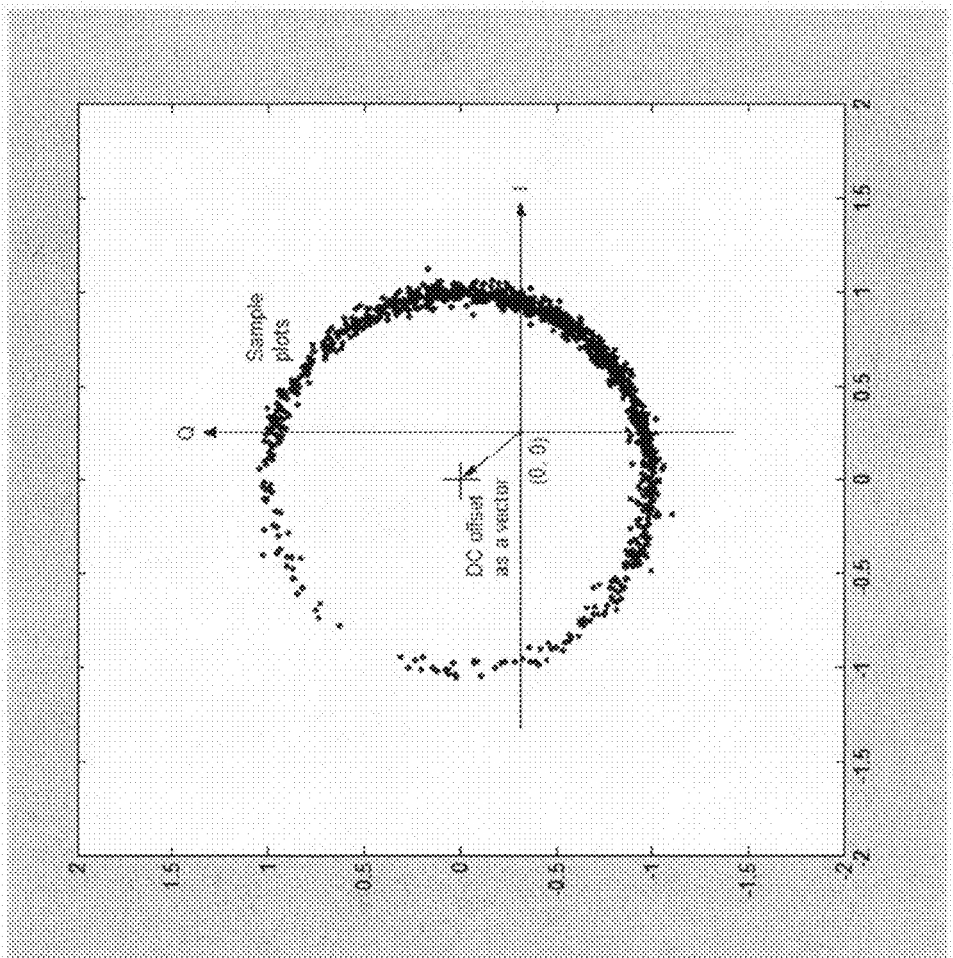

To facilitate an understanding of the present disclosure, reference is made to FIGS. 2a and 2b, which illustrate hypothetical data for purposes of discussion. FIG. 2a illustrates exemplary FM signal samples containing a legitimate DC component that is part of the signal plotted in complex space. FIG. 2b illustrates exemplary FM signal samples plotted with a DC offset in complex space, i.e., in which the legitimate DC component has been removed, for example, by DC blocking filters. Approaches for compensating for the DC offset, i.e., for recovering the legitimate DC component are described herein.

FM signals are constant modulus signals, i.e., they have substantially a constant magnitude when plotted in complex space. Accordingly, without the DC offset described above, samples of constant modulus signals (e.g., analog FM samples) are located substantially on a circle centered on the origin (0, 0) with a radius equal to the magnitude of the samples as illustrated in FIG. 2a. Other types of modulation also have the constant modulus property such as binary phase shift keying (BPSK) and quadrature phase shift keying (QPSK). Thus, while described primarily in terms of FM signals, the exemplary embodiments described herein are generally applicable to other types of constant modulus signals.

The DC offset causes the center of the circle to be shifted from the origin, such as illustrated by the exemplary FM signal samples shown in FIG. 2b. As illustrated in FIG. 2b, the DC offset may have both real and imaginary components. Exemplary approaches described herein can estimate the DC offset to recover an estimated value for the legitimate DC component of the baseband signal.

According to one exemplary approach, any three data points of a set of signal samples can be chosen from which to determine a DC offset. The three data points can be treated as lying on a circle by virtue of the constant modulus property noted previously. Thus, the DC offset can be estimated as being a center of a circle determined from those three data points. The equation of a circle is generally given by $(x-h)^2 + (y-k)^2 = R^2$, where $(h, k)$ represents the coordinate of the center of the circle in the x-y plane and where R represents the radius of the circle. The quantities h, k and R represent three unknown quantities, which can be derived from solving a system of three equations for the three unknown quantities. Thus, three data points $(x_1, y_1)$, $(x_2, y_2)$, and $(x_3, y_3)$ can be selected in any suitable way from among the signal samples, e.g., by random selection, selecting one data point from each of three different quadrants if the data are so distributed as to encompass all four quadrants, selecting three data points from two different quadrants, or selecting the data points from the same quadrant, so long as they do not fall in a line. As a general matter, this technique will typically be more accurate when the samples selected are more widely dispersed from each other. The $(x_1, y_1)$, $(x_2, y_2)$, and $(x_3, y_3)$ values can then be substituted into the above-noted equation to yield a set of three equations for solving the three unknown quantities h, k and R using standard mathematical techniques such as conventional matrix methods, and the center of the circle $(h, k)$ will then represent the estimated DC offset. Thus, substituting in the three points into this equation gives:

$$(x_1-h)^2 + (y_1-k)^2 - R^2 = 0$$

$$(x_2-h)^2 + (y_2-k)^2 - R^2 = 0$$

$$(x_3-h)^2 + (y_3-k)^2 - R^2 = 0.$$

These equations form a homogeneous system that can be solved for h, k and R knowing $(x_1, y_1)$, $(x_2, y_2)$, and $(x_3, y_3)$ by conventional, known algebraic techniques, e.g., matrix techniques, as will be understood by those of ordinary skill in the art. The value of $(h, k)$, i.e., the real and imaginary components of the center of the circle in the complex (real-imaginary) plane, provides the DC offset. The resulting estimated DC offset can then be subtracted from the input complex baseband samples 70 in adder 72. While this example is described in terms of subtracting an estimated DC offset, it should be noted that this is equivalent to adding an estimated DC component to the baseband samples 70 and that either operation could be performed.

In addition, to further improve the accuracy of estimating the DC offset using this approach, multiple sets of three data points can be selected as described above, multiple individual DC offsets can be calculated from those multiple sets of three data points, and the multiple individual DC offsets can be averaged. Choosing how many sets of three data points to examine is within the purview of one of ordinary skill in the art and may include, for example, choosing a predetermined number of sets of data points, choosing multiple sets of data points corresponding to a predetermined fraction of data obtained in a given time period (e.g., all or some lesser fraction), or any other suitable approach.

According to another exemplary approach, estimating the DC offset can be carried out based on minimizing an error function. The error function will typically have a minimum when the DC offset is correctly determined, and will typically increase monotonically when the DC offset estimation moves away from the correct value. This error function may be constructed from the signal samples treating the DC offset as an unknown quantity, and then solved to determine the estimated DC offset by minimizing the error function. This DC offset can then be subtracted from the filtered baseband signal to recover the original DC component of the baseband signal.

Figure 3:
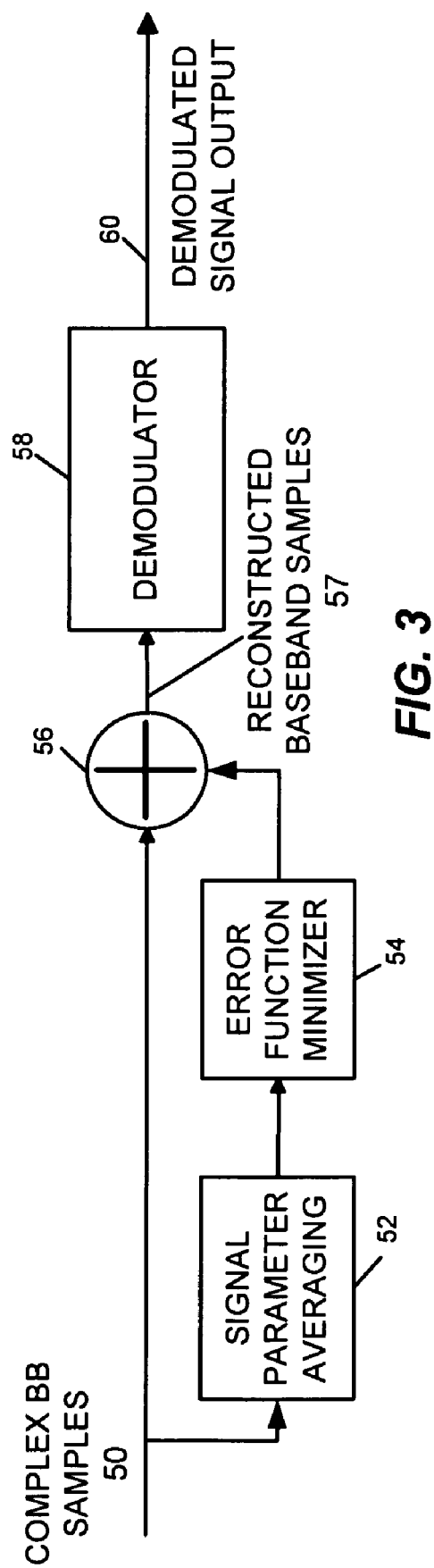
FIG. 3 illustrates a functional block diagram for recovering a DC component in accordance with certain embodiments.

An exemplary functional block diagram for recovering the filtered DC component of the received signal according to one example is illustrated in FIG. 3. The functions illustrated in FIG. 3 can be performed in the baseband processor 38. The complex I and Q baseband samples 50 are input into a signal parameter averaging block 52, wherein a suitable number of samples are collected and the error function is constructed. For example, a predetermined number of sample points or a number of sample points obtained in a predetermined time period may be collected, for example, and stored in memory, e.g., RAM. In certain embodiments, a suitable error function may be defined as:

$$E = \frac{1}{4N} \sum_i [|y_i|^2 - R^2]^2$$

where $y_i = x_i + X$ represents the complex baseband output samples, or DC recovered samples, $x_i$, $i = 1 \ldots N$ represents the complex baseband input samples, X represents the complex DC component, and R represents the modulus estimation.

Another error function that may be suitable in certain embodiments may be defined as:

$$E = \frac{1}{N}\sum_i |(|y_i| - R)|.$$

The number of samples that are collected is implementation specific and may involve certain tradeoffs. For example, collecting more samples typically involves longer time periods and more computations, but may be more robust against noise in the baseband samples. In certain embodiments, samples may be gathered for a predetermined period of time or until a specific number of samples are gathered. Typically for analog FM signals, collecting about 10 ms of samples may be sufficient for reliable DC component estimation. However, more or less samples may be gathered depending on implementation requirements, the choice of which is within the purview of one of ordinary skill in the art. The number of samples gathered depends on the sample rate, which is implementation dependent but typically exceeds 200 kHz. As an example, selecting samples over 10 ms at a sample rate of 800 kHz amounts to collecting 8000 samples.

The error function constructed in the signal parameter averaging block 52 is then input into the error function minimizer block 54, wherein the error function can be solved. In certain embodiments, the error function may be solved using linear equation solution algorithms as would be known to those of ordinary skill.

For example, the gradient of the error function with respect to the DC offset and the modulus may be calculated as:

$$\nabla E = \begin{bmatrix} \partial E/\partial X \\ \partial E/\partial R \end{bmatrix} = \begin{bmatrix} \frac{1}{N}\sum_i [(|y_i|^2 - R^2)y_i] \\ \frac{1}{N}\sum_i [(|y_i|^2 - R^2)R] \end{bmatrix}$$

Accordingly, the minimum of error E can be found by setting $\nabla E=0$. First set $\partial E/\partial R=0$ to find the optimal estimation of the amplitude $$R^2 = \frac{1}{N}\sum_i |y_i|^2.$$

Then substitute this into $\partial E/\partial X$, such that $$\frac{\partial E}{\partial X} = \frac{1}{N}\sum_i \left[\left(|y_i|^2 - \sum_i |y_i|^2\right)y_i\right].$$

The equation $\partial E/\partial X=0$ can be expanded using real and imaginary parts of each variable as follows:

$$2\begin{bmatrix} \overline{x_I^2} - \overline{x_I}^2 & \overline{x_I x_Q} - \overline{x_I}\,\overline{x_Q} \\ \overline{x_I x_Q} - \overline{x_I}\,\overline{x_Q} & \overline{x_Q^2} - \overline{x_Q}^2 \end{bmatrix}\begin{bmatrix} X_I \\ X_Q \end{bmatrix} + \begin{bmatrix} \overline{|x|^2 x_I} - \overline{|x|^2}\,\overline{x_I} \\ \overline{|x|^2 x_Q} - \overline{|x|^2}\,\overline{x_Q} \end{bmatrix} = 0$$

where the $$\overline{a} = \frac{1}{N}\sum_i a_i$$

represents the average of a. For example, a block of data may include approximately 8000 samples collected over approximately 10 ms. Thus to calculate the average DC component over 10 ms as previously described, the expression $$\overline{a} = \frac{1}{8000}\sum_{i=1}^{8000} a_i$$

can be evaluated. If it is desirable to speed up the estimation, the averages may be calculated in smaller blocks of 2000 samples for example. A low pass digital filter, such as a simple $1^{st}$ order infinite impulse response (IIR) filter with a system function z-transform $$H(z) = \frac{\alpha}{1 - (1-\alpha)z^{-1}}, \alpha \approx 0.2,$$

may be used to filter the averages of the smaller blocks to obtain smoother averages equivalent to large block averages.

This gives a standard linear equation which can be written in the form:

$$\begin{bmatrix} a_{11} & a_{12} \\ a_{21} & a_{22} \end{bmatrix}\begin{bmatrix} X_I \\ X_Q \end{bmatrix} - \begin{bmatrix} b_1 \\ b_2 \end{bmatrix} = 0$$

with solutions:

$$X_I = \frac{b_1 a_{22} - b_2 a_{12}}{a_{11}a_{22} - a_{12}a_{21}}, X_Q = \frac{b_2 a_{11} - b_1 a_{21}}{a_{11}a_{22} - a_{12}a_{21}}$$

The estimated DC component X is then added to the input complex baseband samples 50 in adder 56. The reconstructed baseband samples 57 are then sent to a demodulator 58 (e.g., an analog demodulator) that demodulates the baseband samples into a demodulated signal output 60, for example, an analog audio signal. It should be noted that the DC component is equivalent to the negative of the DC offset. Accordingly, subtracting the DC offset from the input complex baseband samples is the same as adding the DC component to the input complex baseband samples.

This first exemplary process may be advantageous because it is an open loop system, and therefore it may provide a rapid estimation of the DC offset and there will typically not be any issues with convergence on the solution. However, in certain implementations the solution may include multiplications up to the $5^{th}$ order, and divisions, for input samples, which may make fixed point implementations computationally intensive.

Figure 4:
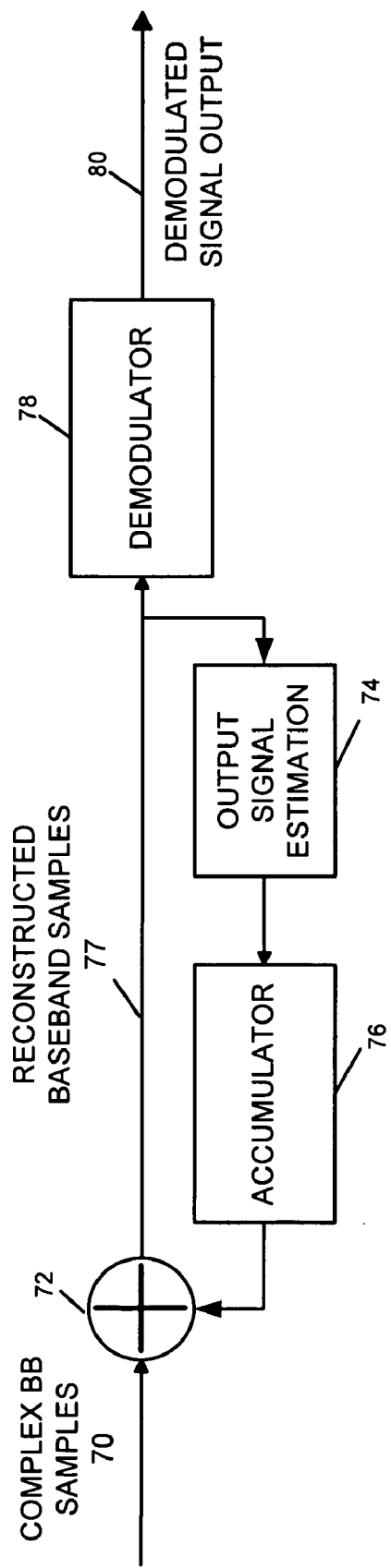
FIG. 4 illustrates a block diagram of another exemplary process for recovering a DC component in accordance with certain embodiments.

Accordingly, a second exemplary functional block diagram of an exemplary iterative process for recovering the filtered DC component of the received signal is illustrated in FIG. 4. The functions illustrated in FIG. 4 can be performed in the baseband processor 38. The complex I and Q baseband samples 70 are input into an adder 72, which is part of an iterative feedback loop. An output signal estimation block 74 collects a suitable number of samples and constructs the error function. This error function may be similar to the error function described above, e.g., $$E = \frac{1}{4N} \sum_i [|y_i|^2 - R^2]^2.$$

Moreover, the gradient of the error function with respect to the DC offset may still be calculated as:

$$\frac{\partial E}{\partial X} = \frac{1}{N} \sum_i \left[ \left( |y_i|^2 - \sum_i |y_i|^2 \right) y_i \right]$$

However, in contrast to the exemplary process described above, the error function can be solved iteratively, with each successive solution being stored in accumulator block 76, which may include any suitable memory such as, for example, SDRAM or SRAM. A consideration for utilizing an iterative approach is the time required to converge to an estimated DC component since an iterative approach may take longer than the direct approach previously described. Specifically, the convergence time will affect the amount of time it takes for a receiver to produce a good quality steady state audio reproduction and therefore may impact listener satisfaction. In other words, the iterative adjustments to the estimated DC component may be perceived by a listener like a noise component added to the baseband signal. For example, in certain embodiments such as for an FM signal, a 30 dB signal power to noise ratio (SNR) may produce an acceptable audio quality. Preferably, the convergence time will be less than 100 ms to avoid listener dissatisfaction, and shorter times are even more desirable. However, other values may be suitable consistent with the response time of specific receivers. Additionally, in certain embodiments, it may be desirable to mute the audio while the receiver is calculating the DC component to avoid audio distortions during this time period.

The iterative solution starts with choosing a starting value for the DC component such as, for example, the origin (0, 0). Other suitable starting values could be based on, for example, taking a simple average of a predetermined number of sample values (real and imaginary components), for example 1000 values, and using this as the starting point. In certain embodiments, the starting value could be obtained from the end result of the open loop system described above. For example, an initial estimated DC component could be calculated using the open loop process, and then subsequent calculations could be performed using the estimated DC component from the open loop process as a starting value. Advantageously, this can provide an accurate starting condition that facilitates minimizing the number of iterations performed.

The differential $\partial E/\partial X$ indicates the direction in the complex coordinate plane of the fastest increment of the error E. Thus by adjusting X in the opposite direction based upon $-\partial E/\partial X$, successive iterations can be carried out until the result converges on a final solution such that some stopping condition is satisfied, e.g., until successive changes in the calculated DC offset are below some predetermined value, or until the percent change in the DC offset from one iteration to the next is below some predetermined percentage. In certain embodiments, the stopping condition could be expressed in dB as a fraction of the DC component value. For example, for a signal power $R^2$, a $-30$ dB DC component power adjustment would be $R^2/1000$. Thus a suitable stopping condition could be $|X[k+1]-X[k]|^2 \leq R^2/1000$. Typical values for the DC component power adjustment could range from, for example, $-25$ dB to $-40$ dB, e.g., $-25$ dB, $-30$ dB, or $-40$ dB. The stopping condition could also be expressed as an equivalent percentage as would be readily apparent to one of skill in the art. While very low values and/or percentages are theoretically possible, actual implementations should preferably use values that are greater than the noise and normal variation of the DC component in the system. Other stopping conditions such as reaching a predetermined number of iterations or reaching a predetermined time interval of iterations could be used as well. For example, in exemplary embodiments, 100 iterations with a block duration of 3 ms (thus corresponding to 300 ms) may achieve satisfactory convergence on the DC offset (e.g., better than $-30$ dB) even in distorted channel conditions. The number of iterations required will be implementation specific and will depend in part on the channel conditions and the accuracy of the starting value. Typically, more accurate default starting values will facilitate using fewer iterations. For example, if the starting condition is calculated using the open loop process as described above, then the initial starting value will typically be more accurate and the number of iterations performed may be reduced. In certain embodiments, the audio output could be muted until the stopping condition is met to minimize audio distortions during the initial convergence process.

An exemplary iterative calculation can be represented as follows:

$$X[k+1] = X[k] - \mu \frac{\partial E}{\partial X} = X[k] - \mu \overline{(|y|^2 - \overline{|y|^2}) y}$$

where $\mu$ determines the step size. The choice of $\mu$ will typically involve a trade off between speed of convergence and quality. In certain embodiments, a suitable value could be found by collecting test data and empirically determining a proper step size to achieve convergence in a desired amount of time, e.g., 100 ms. For example, a suitable $\mu$ value may be about $1/(nR^2)$, where n is a scalar that may be between about 0.1 and 10.0, for example, about 0.1, 0.5, 1.0, 2.0, 5.0, or 10.0. One of skill in the art would recognize that $\mu$ may be varied during the iterative process, for example, in course and fine step sizes. Thus, in this way, successive approximations for the original DC component can be generated iteratively until a stopping condition is satisfied to determine the estimated quantity for the original DC component. During the iterative DC component calculation there may be points at which the step size changes direction (e.g., from positive to negative or from negative to positive) as the calculation converges on a solution. Around those points, the step size may be small enough so that the stopping condition is satisfied (e.g., $|X[k+1]-X[k]|^2 \leq R^2/1000$) but it may still be desirable to perform further iterations to reach a stable solution. To account for this, certain embodiments provide for performing a predetermined number of stability checks after the stopping condition is satisfied. For example, once the stopping condition is satisfied, 10 more iterations could be performed before determining that a stable solution has been reached. If the result of one or more of these 10 iterations exceeds the stopping condition, then the iterations can be continued until 10 consecutive iterations are less than the stopping condition. Any suitable number of stability checks could be performed such as, for example, 1, 2, 5, 10, 15, or 20.

The resulting estimated DC component X is then added to the input complex baseband samples 70 in adder 72. The reconstructed baseband samples 77 are then sent to a demodulator 78 (e.g., an analog demodulator) that demodulates the baseband samples into demodulated output signal 80, for example, an analog audio signal.

Advantageously, such an iterative process will typically only perform multiplications up to $3^{rd}$ order of the samples, and no division, for the input samples. Thus the number of multiplications may be reduced. However, an iterative process will typically take more time to converge on a final solution than an open loop process for the same implementation. Thus there may be a trade off in terms of convergence speed and stability of the feedback loop.

Figure 5:
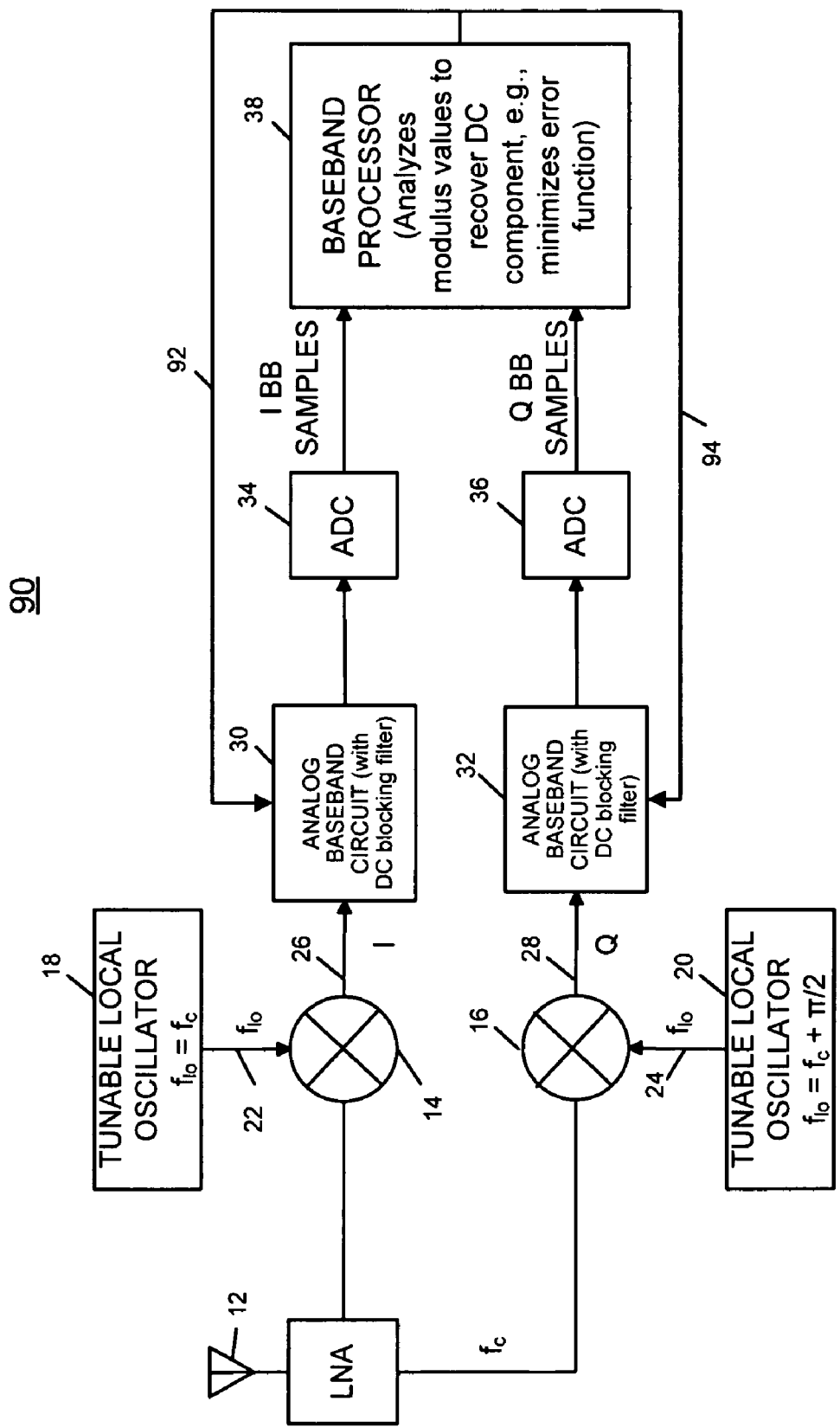
FIG. 5 illustrates a block diagram of an exemplary digital radio broadcast receiver in accordance with certain embodiments.

In certain exemplary embodiments, the estimated DC offset may be fed back and provided as an input to the DC blocking filters in the analog baseband circuits 30, 32. FIG. 5 illustrates an exemplary zero-IF digital radio broadcast receiver 90 that includes this feedback path. As illustrated, once the DC offset is estimated by the DC component recovery process in the baseband processor 38, it is then fed back on lines 92, 94 to the analog baseband circuits 30, 32. In these exemplary embodiments, the DC blocking filters in the analog baseband circuits 30, 32 are configured to adapt their transfer functions based on the input DC offset signal. Suitable DC blocking filters could include, for example, an analog voltage adder. In such a configuration the DC component estimated by the baseband processor 38 can be converted from a digital signal to an analog signal and applied to the voltage adder, thereby adding the DC component to the zero-IF signal from the mixer 14, 16 and removing the unwanted DC voltage. Such a configuration may be advantageous because there may be minimal disturbance of the low frequency signal components and it can minimize stop-band bandwidths in the DC blocking filters of the analog baseband circuits 30, 32.

Under certain circumstances, the DC offset may vary over time. For example, when the receiver is tuned to a different frequency, the DC offset may change due to the change in local oscillator frequency. Additionally, radio propagation effects such as noise and interference may cause the modulus of the signal, and therefore the actual DC offset, to deviate from constant. Advantageously, deviations in the actual DC offset can be accounted for by certain embodiments of the present disclosure. For example, the estimated DC offset can be recalculated from time to time to adjust for any variations. This recalculation can be performed, for example:

1) Whenever the receiver is tuned to a new frequency;
2) At a predetermined period such as, for example, every 5 seconds, every 5 minutes; or
3) Continuously as long as the receiver is operating.

Naturally, the more frequently the DC offset is recalculated the more robust the system will be to noise and interference. However, more frequent recalculations will typically mean that more processing resources are utilized.

Figure 6:
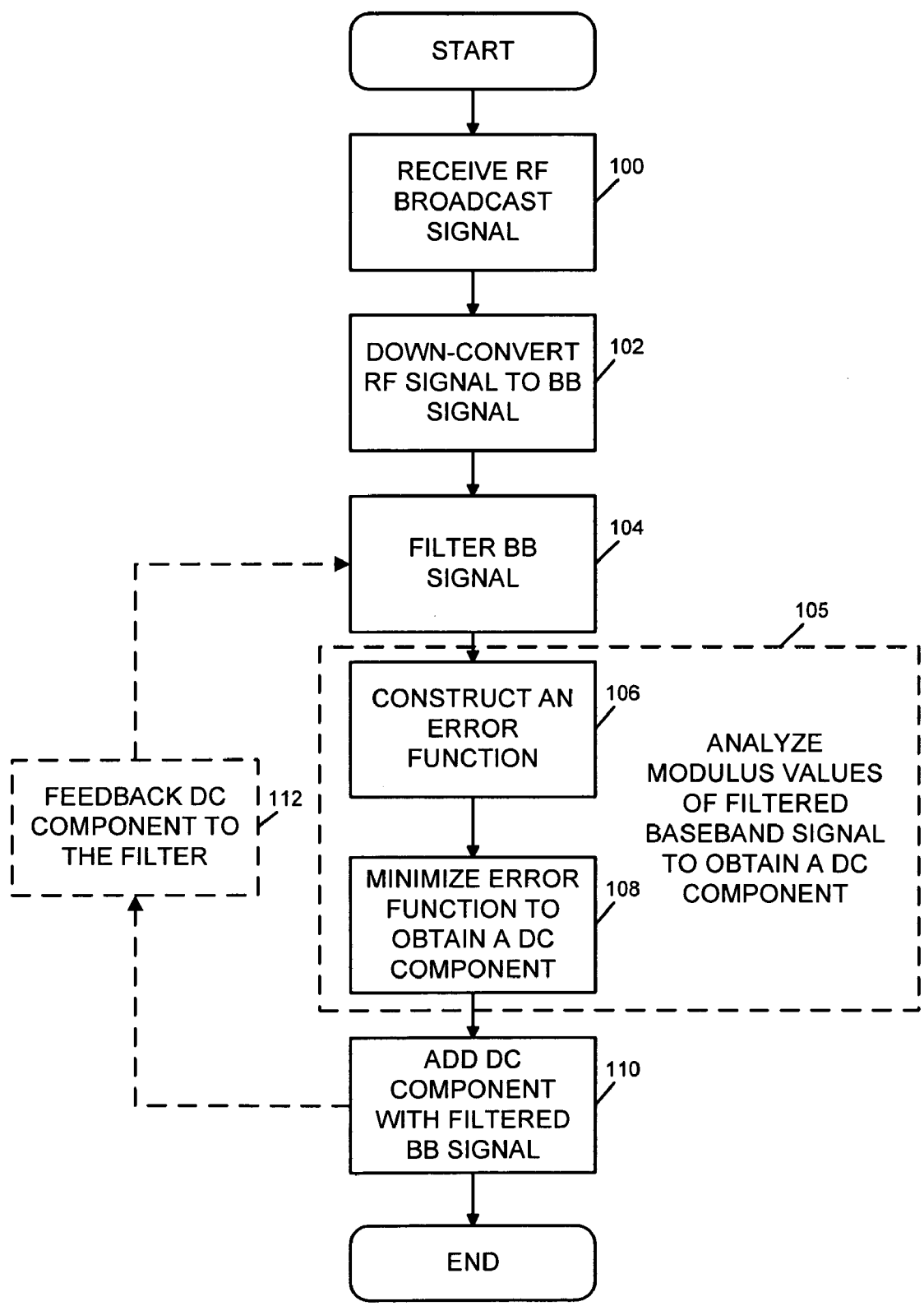
FIG. 6 shows a flow chart illustrating an exemplary process for recovering a DC component in accordance with certain embodiments.

FIG. 6 illustrates a flow diagram of an exemplary process for DC component recovery in a zero-IF radio receiver. In step 100 the antenna 12 receives a radio frequency signal. The radio frequency signal may be, for example, a radio frequency broadcast signal, such as an FM modulated signal, which may include a digital radio broadcast signal in sideband portions thereof. The radio frequency signal could also be another type of constant modulus signal, such as a QPSK modulated signal, for example. Mixers 14, 16 mix this radio frequency signal with signals from tunable local oscillators 18, 20, thereby down-converting the radio frequency signal directly to an original baseband frequency signal in step 102. This original baseband frequency signal includes an original DC component.

Next, in step 104, the DC blocking filters of the analog baseband circuits 30, 32 filter the original baseband signal to remove an unwanted DC voltage, thereby obtaining a filtered baseband signal. The DC blocking filters may be, for example, any suitable high-pass or DC notch filter (e.g., composed of resistors and capacitors), which may include, for example, passive, active, and/or DC feedback implemented in DC amplifiers. As a result of this filtering the original DC component is removed from the baseband signal.

In step 105, the baseband processor 38 analyzes the modulus values of the filtered baseband signal to determine an estimated quantity for the DC component. This analysis may be carried out in any of the ways described above for determining the DC offset. For example, step 105 can be carried out by calculating the DC offset as the center of a circle determined from any three data points of the set of signal samples using a system of three equations by algebraic, e.g., matrix, techniques. Alternatively, this approach may be used to calculate multiple DC offset values from multiple sets of three data points, and those multiple DC offset values can then be averaged to determine an average value of the DC offset, which is then treated as the recovered original DC component of the baseband signal.

As another example, step 105 can be carried out by the combination of steps 106 and 108. For example, as shown by step 106 an error function can be constructed representing the original DC component. Constructing the error function can include collecting a number of filtered baseband signal samples and populating a suitable error function with those values. The error function constructed may be, for example, $$E = \frac{1}{4N} \sum_i [|y_i|^2 - R^2]^2,$$

where $x_i$, i=1 ... N represents the filtered baseband signal samples, X represents the DC component, $y_i=x_i+X$ represents reconstructed baseband signal samples, and R represents a modulus estimation, such as described above.

In step 108 the baseband processor 38 minimizes the error function to determine an estimated DC component. Minimizing the error function can include setting a gradient of the error function $$\nabla E = \begin{bmatrix} \partial E / \partial X \\ \partial E / \partial R \end{bmatrix},$$

and solving to find an estimation of the DC component. The error function may be solved algebraically or iteratively as described above to determine a value for the DC component. In certain embodiments, the error function may initially be solved algebraically to obtain an initial estimation for DC component which serves as a starting value, and then subsequently the error function can be solved iteratively using the starting value from the algebraic solution.

In certain embodiments, the baseband processor 38 may optionally feed back the estimated DC component to a voltage adder such that a portion of the unwanted DC voltage from the mixer 14, 16 is removed. This results in the DC blocking filters of the analog baseband circuits 30, 32 having a minimized stop-band bandwidth. In step 110, the baseband processor 38 adds the estimated DC component to the filtered baseband signal to compensate for the removal of the original DC component such that a reconstructed baseband signal is obtained.

The previously described embodiments of the present disclosure have advantages. One advantage is that in certain embodiments, a DC component can be recovered in a zero-IF architecture, thereby facilitating the use of a zero-IF architecture with FM IBOC DAB receivers. Because the zero-IF architecture may have low power consumption and easy integration with other components, it may facilitate the use of FM IBOC receivers in, for example, portable applications. Also, allowing the use of zero-IF architecture for the analog FM section may facilitate having a single zero-IF section for both analog and digital signals. It may also be advantageous for analog FM receivers.

The exemplary approaches described may be carried out using any suitable combinations of software, firmware and hardware and are not limited to any particular combinations of such. Computer program instructions for implementing the exemplary approaches described herein may be embodied on a computer-readable medium, such as a magnetic disk or other magnetic memory, an optical disk (e.g., DVD) or other optical memory, RAM, ROM, or any other suitable memory such as Flash memory, memory cards, etc.

Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method for DC component recovery in a zero-IF radio receiver comprising the steps of:
   receiving a frequency modulated (FM) radio frequency broadcast signal;
   down-converting the frequency modulated radio frequency broadcast signal directly to an original baseband frequency signal, wherein the original baseband frequency signal includes an original DC component;
   filtering the original baseband signal to obtain a filtered baseband signal, wherein the original DC component is removed;
   analyzing modulus values of the filtered baseband signal to determine an estimated quantity for the original DC component; and
   adding the estimated quantity for the original DC component to the filtered baseband signal to compensate for removal of the original DC component such that a reconstructed baseband signal is obtained.

2. The method of claim 1 wherein analyzing modulus values of the filtered baseband signal comprises the steps of:
   constructing an error function representing the original DC component; and
   minimizing the error function to determine the estimated quantity for the original DC component.

3. The method of claim 2 wherein constructing the error function includes collecting a plurality of samples of the filtered baseband signal.

4. The method of claim 3 wherein the error function is $$E = \frac{1}{4N} \sum_i [|y_i|^2 - R^2]^2,$$

wherein $x_i$, $i=1 \ldots N$ represents the plurality of filtered baseband signal samples, X represents a DC offset, $y_i = x_i + X$ represents a plurality of reconstructed baseband signal samples, and R represents a modulus estimation.

5. The method of claim 4 wherein minimizing the error function is based upon setting a gradient of the error function $$\nabla E = \begin{bmatrix} \partial E / \partial X \\ \partial E / \partial R \end{bmatrix},$$

and solving to find an estimation of the DC offset.

6. The method of claim 1 wherein filtering the original baseband signal comprises passing the original baseband signal through a DC notch filter.

7. The method of claim 1 wherein filtering the original baseband signal comprises passing the original baseband signal through a high-pass filter.

8. The method of claim 1, wherein analyzing modulus values of the filtered baseband signal to determine an estimated quantity for the original DC component comprises algebraically solving a system of equations.

9. The method of claim 1, wherein analyzing modulus values of the filtered baseband signal to determine an estimated quantity for the original DC component comprises generating successive approximations for the original DC component iteratively until a stopping condition is satisfied to determine the estimated quantity for the original DC component.

10. The method of claim 1 further comprising the step of feeding back the estimated DC component to a voltage adder such that a portion of an unwanted DC voltage from a mixer is removed and wherein a DC blocking filter has a minimized stop-band bandwidth.

11. The method of claim 1, wherein analyzing modulus values of the filtered baseband signal to determine an estimated quantity for the original DC component comprises:
   algebraically solving a system of equations to obtain an initial estimated quantity for the original DC component and using this quantity as a starting value; and
   starting with the starting value and generating successive approximations for the original DC component iteratively until a stopping condition is satisfied to determine the estimated quantity for the original DC component.

12. A system for DC component recovery in a zero-IF radio receiver, comprising:
   a processing system; and
   a memory coupled to the processing system, wherein the processing system is configured to perform the steps of:
      receiving a frequency modulated (FM) radio frequency broadcast signal;
      down-converting the frequency modulated radio frequency broadcast signal directly to an original baseband frequency signal, wherein the original baseband frequency signal includes an original DC component;
      filtering the original baseband signal to obtain a filtered baseband signal, wherein the original DC component is removed;
      analyzing modulus values of the filtered baseband signal to determine an estimated quantity for the original DC component; and adding the estimated quantity for the original DC component to the filtered baseband signal to compensate for removal of the original DC component such that a reconstructed baseband signal is obtained.

13. The system of claim 12 wherein analyzing modulus values of the filtered baseband signal comprises the steps of:
constructing an error function representing the original DC component; and
minimizing the error function to determine the estimated quantity for the original DC component.

14. The system of claim 13 wherein constructing the error function includes collecting a plurality of samples of the filtered baseband signal.

15. The system of claim 14 wherein the error function is $$E = \frac{1}{4N}\sum_i [|y_i|^2 - R^2]^2,$$

wherein $x_i$, i=1 ... N represents the plurality of filtered baseband signal samples, X represents a DC offset, $y_i=x_i+X$ represents a plurality of reconstructed baseband signal samples, and R represents a modulus estimation.

16. The system of claim 15 wherein minimizing the error function is based upon setting a gradient of the error function $$\nabla E = \begin{bmatrix} \partial E/\partial X \\ \partial E/\partial R \end{bmatrix},$$

and solving to find an estimation of the DC offset.

17. The system of claim 12 wherein filtering the original baseband signal comprises passing the original baseband signal through a DC notch filter.

18. The system of claim 12 wherein filtering the original baseband signal comprises passing the original baseband signal through a high-pass filter.

19. The system of claim 12, wherein analyzing modulus values of the filtered baseband signal to determine an estimated quantity for the original DC component comprises algebraically solving a system of equations.

20. The system of claim 12, wherein analyzing modulus values of the filtered baseband signal to determine an estimated quantity for the original DC component comprises generating successive approximations for the original DC component iteratively until a stopping condition is satisfied to determine the estimated quantity for the original DC component.

21. The system of claim 12 further comprising the step of feeding back the estimated DC component to a voltage adder such that a portion of an unwanted DC voltage from a mixer is removed and wherein a DC blocking filter has a minimized stop-band bandwidth.

22. The system of claim 12, wherein analyzing modulus values of the filtered baseband signal to determine an estimated quantity for the original DC component comprises:
algebraically solving a system of equations to obtain an initial estimated quantity for the original DC component and using this quantity as a starting value; and
starting with the starting value and generating successive approximations for the original DC component iteratively until a stopping condition is satisfied to determine the estimated quantity for the original DC component.

23. A processor non-transitory readable medium having instructions thereon adapted to cause a processing system to recover a DC component baseband signal in a zero-IF radio receiver, the instructions configured to cause the processing system to execute a method comprising the steps of:
receiving a frequency modulated radio frequency broadcast signal;
down-converting the frequency modulated radio frequency broadcast signal directly to an original baseband frequency signal, wherein the original baseband frequency signal includes an original DC component;
filtering the original baseband signal to obtain a filtered baseband signal, wherein the original DC component is removed;
analyzing modulus values of the filtered baseband signal to determine an estimated quantity for the original DC component; and
adding the estimated quantity for the original DC component to the filtered baseband signal to compensate for removal of the original DC component such that a reconstructed baseband signal is obtained.

24. The processor readable medium of claim 23 wherein analyzing modulus values of the filtered baseband signal comprises the steps of:
constructing an error function representing the original DC component; and
minimizing the error function to determine the estimated quantity for the original DC component.

25. The processor readable medium of claim 23 wherein filtering the original baseband signal comprises passing the original baseband signal through a DC notch filter.

26. The processor readable medium of claim 25 wherein constructing the error function includes collecting a plurality of samples of the filtered baseband signal.

27. The processor readable medium of claim 26 wherein the error function is $$E = \frac{1}{4N}\sum_i [|y_i|^2 - R^2]^2,$$

wherein $x_i$, i=1 ... N represents the plurality of filtered baseband signal samples, X represents a DC offset, $y_i=x_i+X$ represents a plurality of reconstructed baseband signal samples, and R represents a modulus estimation.

28. The processor readable medium of claim 27 wherein minimizing the error function is based upon setting a gradient of the error function $$\nabla E = \begin{bmatrix} \partial E/\partial X \\ \partial E/\partial R \end{bmatrix},$$

and solving to find an estimation of the DC offset.

29. The processor readable medium of claim 23 wherein filtering the original baseband signal comprises passing the original baseband signal through a high-pass filter.

30. The processor readable medium of claim 23, wherein analyzing modulus values of the filtered baseband signal to determine an estimated quantity for the original DC component comprises algebraically solving a system of equations.

31. The processor readable medium of claim 23, wherein analyzing modulus values of the filtered baseband signal to determine an estimated quantity for the original DC component comprises generating successive approximations for the original DC component iteratively until a stopping condition is satisfied to determine the estimated quantity for the original DC component.

32. The processor readable medium of claim 23 further comprising the step of feeding back the estimated DC component to a voltage adder such that a portion of an unwanted DC voltage from a mixer is removed and wherein a DC blocking filter has a minimized stop-band bandwidth.

33. The processor readable medium of claim 23, wherein analyzing modulus values of the filtered baseband signal to determine an estimated quantity for the original DC component comprises:
 algebraically solving a system of equations to obtain an initial estimated quantity for the original DC component and using this quantity as a starting value; and
 starting with the starting value and generating successive approximations for the original DC component iteratively until a stopping condition is satisfied to determine the estimated quantity for the original DC component.

34. A device for DC component recovery in a zero-IF radio receiver, comprising:
 a processor, wherein the processor is configured to perform steps comprising:
  receiving a frequency modulated (FM) radio frequency broadcast signal;
  down-converting the frequency modulated radio frequency broadcast signal directly to an original baseband frequency signal, wherein the original baseband frequency signal includes an original DC component;
  filtering the original baseband signal to obtain a filtered baseband signal, wherein the original DC component is removed;
  analyzing modulus values of the filtered baseband signal to determine an estimated quantity for the original DC component; and
  adding the estimated quantity for the original DC component to the filtered baseband signal to compensate for removal of the original DC component such that a reconstructed baseband signal is obtained.

\* \* \* \* \*